Feb. 2, 1954  F. O. HESS  2,668,040
FURNACE SYSTEM
Filed Jan. 26, 1950  2 Sheets-Sheet 1
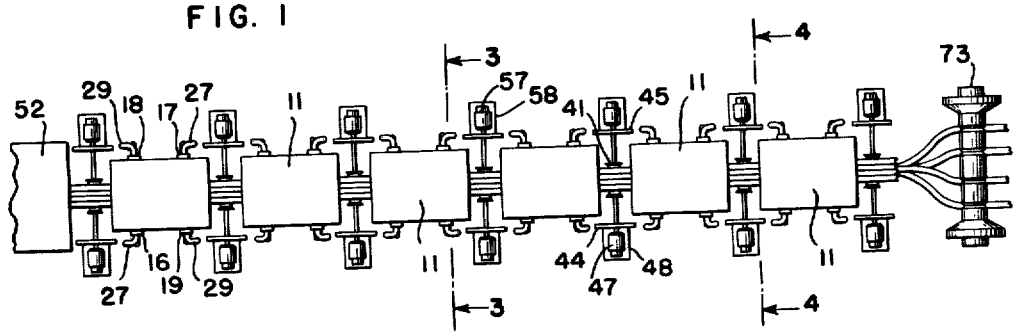
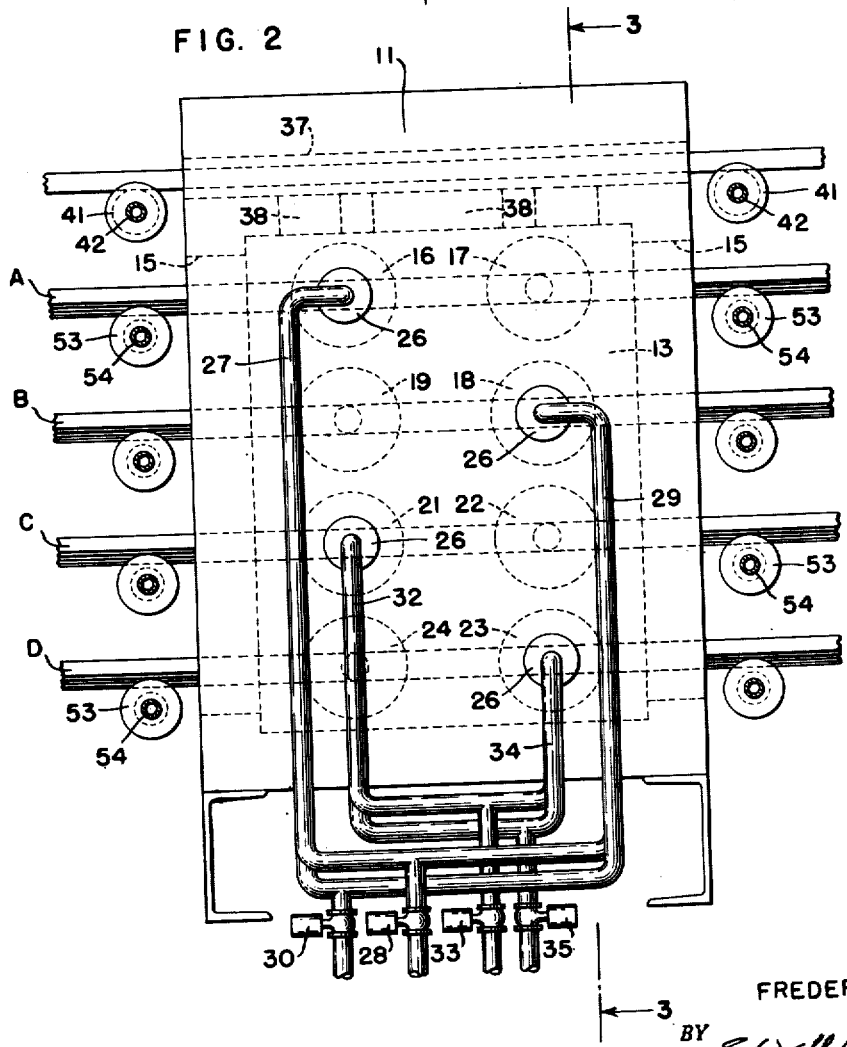
*INVENTOR.*
FREDERIC O. HESS
ATTORNEY.

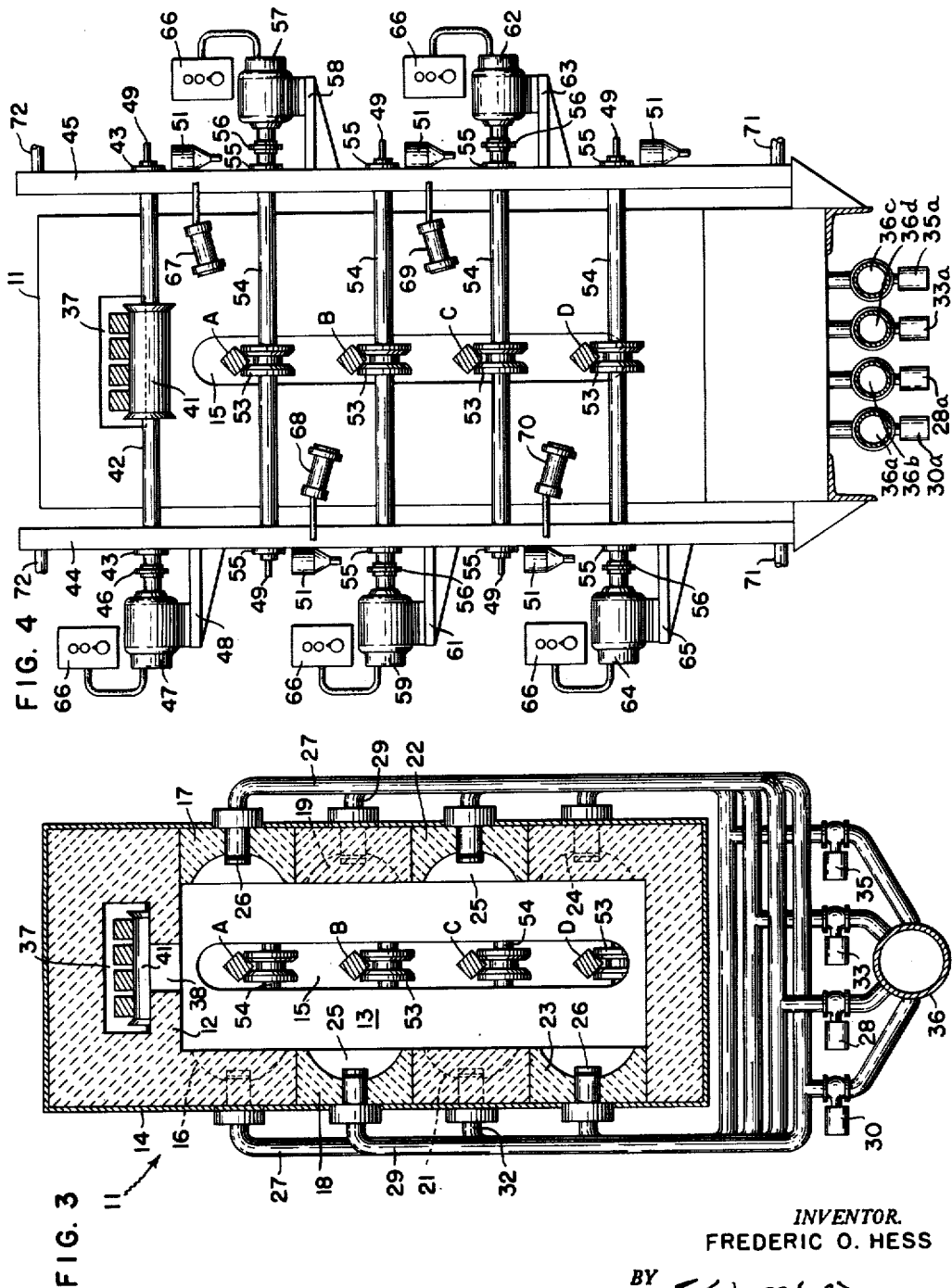

Patented Feb. 2, 1954

2,668,040

UNITED STATES PATENT OFFICE 2,668,040

FURNACE SYSTEM

Frederic O. Hess, Philadelphia, Pa., assignor to Selas Corporation of America, Philadelphia, Pa., a corporation of Pennsylvania Application January 26, 1950, Serial No. 140,650

10 Claims. (Cl. 263—6)

The present invention relates to metal heating, and more particularly to a system for heating simultaneously in a single furnace a plurality of billets with means for obtaining individual control of each billet while it is being heated.

Elongated furnaces comprising a number of furnace units to heat continuously a billet are available. Furnaces of this type have also been used to heat more than one billet at a time. In each case, however, it has been necessary to heat the billets to the same temperature, and to move them through the furnace at the same speed.

In accordance with the present invention there is provided an elongated furnace through which a plurality of billets may be moved simultaneously. The billets are moved individually at speeds required to supply the apparatus to which they are fed. The furnace units are supplied with heat by a series of burners, each of which is focused on a particular billet. Individual billet temperature can be varied within wide limits by varying the heating effect of the burners focused upon them.

It is an object of the invention to provide a heating system for heating simultaneously a plurality of billets to individually controlled temperatures. It is a further object of the invention to provide means for moving a plurality of billets through a furnace at individually controlled speeds.

Means is also provided in the furnace to use the gases of combustion to preheat the incoming billets. To this end a chamber is provided in each unit of the furnace through which incoming billets are passed in counterflow to the billets that are being heated for use. It is, therefore, a further object of the invention to preheat continuously billets as they are being supplied to the furnace.

In the arrangement disclosed the billets being heated are moved singly one above the other in a plurality of rows with one billet following another in each row. Immediately upon leaving the furnace the heated billets are passed to the apparatus in which they are to be used. The billets being preheated are moved through the furnace at an elevation above those being heated. Means is provided at the entrance of the furnace for moving the preheated billets down to the individual heating rows.

The work being heated by the furnace system of this invention is described as being billets. It will be apparent, however, that other types of work, such as tubes and skelp, may also be heated if desired. The invention is described as being used for heating billets by way of example only.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

In the drawings:

Figure 1 is a plan view of the furnace system;

Figure 2 is an enlarged side view of one furnace unit;

Figure 3 is a sectional view of a furnace unit taken on lines 3—3 of Figure 1 and Figure 2; and Figure 4 is a section taken on line 4—4 of Figure 1.

Referring to the Figure 1, it will be seen that the furnace system of the present invention is shown as including six furnace units 11. It will be apparent, however, that a greater or less number of the furnace units may be used depending upon the size of the billets being heated and the speed with which they are moved through the furnace. Each of the furnace units, as best shown in Figures 2 and 3, is made of suitable refractory material 12 which will withstand the temperature to which the furnace unit is heated. The refractory material may be monolithic or may consist of individual blocks that are laid to form a furnace chamber which is generally rectangular in section, such as is shown at 13 in the drawing. The refractory material is backed up and supported by metal shielding 14 which, in turn, may be suitably braced by structural steel members as is common in the furnace manufacturing art. Entrance to the furnace chamber is obtained through vertically extending elongated openings 15 formed in each end of the furnace unit. If desired, the end faces of the furnace may be provided with water-cooled jackets in order to protect the metal shielding at the points adjacent to the openings formed therein. The furnace units are mounted on suitable structural steel foundations with the openings 15 axially aligned.

The furnace units, as shown in the drawings, are designed to heat simultaneously four billets indicated at A, B, C and D. These billets are displaced vertically with respect to each other and are heated by burners that are directed toward each billet. For this purpose burners are located in opposite sidewalls of the furnace and are displaced lengthwise with respect to the furnace chamber on a level with each billet. As shown, burners 16 and 17 are on opposite sides of billet A. Burners 18 and 19 are on opposite sides of billet B. In a like manner, burners 21 and 22 are directed toward the billet C, while burners 23 and 24 are directed toward the billet D. It will be seen from an inspection of Figure 2 of the drawing that the burners are staggered with relation to each other on opposite sides of the furnace so that the heat distribution of the furnace as a whole will be even, while the heat from each pair of burners on a different vertical level will be directed toward the billet passing through the furnace chamber at that level. The burners disclosed herewith may be, and preferably are, of the type disclosed in Furczyk application Serial Number 56,616, filed on October 26, 1948, now Patent 2,561,793. Each of these burners includes a refractory block which is provided with a cup-shaped depression 25 having an opening in its base. Extending into the base of each burner is a distributor member 26 through which fuel and air are supplied to be burned in the cup. The burner cup is heated to a high degree of incandescence to direct radiant heat rays toward the work. The heating takes place predominantly by the direct rays of radiant heat, but a considerable amount of heating is also produced by the highly turbulent products of combustion which are passing into the furnace chamber.

The upper level of burners are supplied with fuel and air through a pipe 27 that has a valve 28 in it. This pipe, as best shown in the drawings, is substantially U-shaped with a downwardly extending supply member in which the valve 28 is located. In a similar fashion, the second level of burners is supplied through a pipe 29 having a valve 30 in it. The third layer of burners is supplied through a pipe 32 having a valve 33 in it, and the bottom layer of burners is supplied through a pipe 34 having a valve 35 in it. Each of these pipes is connected, as shown in Figure 3, to a supply main 36 extending lengthwise of the furnace system under each of the furnace units. The supply of fuel to each layer or row of burners in a furnace unit can be individually regulated by adjusting the valve in the pipe leading to that layer.

If it is desired, each of the layers or rows of burners for each of the furnace units may be connected to individual mains 36a, 36b, 36c and 36d as is shown in Figure 4 of the drawings. In this case there is a valve 30a, 28a, 33a and 35a respectively, which is used to regulate the flow of fuel through each of the four supply mains. In the arrangement shown in Figure 3 of the drawing it is necessary to have a control valve in the supply pipe for each layer of burners for each of the furnace units, whereas, with the arrangement shown is Figure 4 it is necessary to have only one supply valve to regulate the burners on a common level in all of the furnace units. The particular valve and main arrangement which is used will vary depending upon local conditions at any particular installation, as well as upon the apparatus to which the heated billets are to be supplied. With either arrangement, however, the burners on each level of each unit, or the entire furnace, may be adjusted independently of the burners on any other level.

While the billets are being heated it is desired to utilize the products of combustion passing from the burners to preheat additional billets that will be supplied to the furnace chambers 13. To this end a second or preheating chamber 37 is formed in the upper part of each of the furnace units and is connected with the chamber 13 by means of a plurality of passages 38. In the operation of the furnace the hot products of combustion will be exhausted through the openings 15 as well as through the ends of the chamber 37. These products of combustion, known as a "sting out," serve to blanket the billets in a hot gaseous envelope to prevent cooling thereof as they are passing between furnace units. The "sting out" also serves to protect the heated billets from the atmosphere so that oxidation thereof cannot take place while they are travelling from one end of the furnace system to the other.

The billets are moved into the preheating chambers 37 from the right end of the furnace in Figure 1 by any convenient type of loading mechanism. The billets are placed on conveying rollers 41 that may be, and as shown, are located at the ends of the furnace and between each of the furnace units. These rollers are mounted upon shafts 42 that are journaled in bearings 43. The bearings are mounted respectively in water-cooled walls 44 and 45 that are suitably located outside of the furnace itself, and between each of the furnace units, as is best shown in Figure 1 of the drawings. Water may be circulated through the walls by means of inlets 71 and outlets 72, or in any other suitable manner. Each of the shafts 42 is connected by a coupling 46 to an individual motor 47 that is suitably mounted on a bracket 48 extending from the outside of the wall 44. It is preferable that the shafts 42 be water-cooled and to this end there is provided an inlet 49 for cooling water at the right end of the shaft and there is provided a trough 51 below the shaft into which the water flows after it has completed its cooling function. The water flows from the shaft into the trough so that it can be determined merely by looking at the end of the shaft whether or not circulation of the cooling water is taking place.

Rollers 41 are rotated by the motors 47 in a direction to move the billets being heated from the right to the left in Figure 1. During their passage through the furnace these billets are heated by the exhaust gases from the burners passing up into the chamber 37 and exhausting through each end of each of the chambers. When the billets have moved through the furnace they are received by a handling mechanism 52, the details of which form no part of the present invention. This mechanism receives the preheated billets and places them one above the other in a position to be supplied to the furnace at levels A, B, C and D for their final heating. The billets are supplied by the handling mechansm to conveying rollers 53 that are so shaped that each billet is supported as shown with its sides running diagonal to the vertical. Each of the conveying rollers 53 for supporting the billets as they are being heated is identical. These rollers are mounted on shafts 54 that are journaled in bearings 55 located in the walls 44 and 45. Each shaft is connected through a coupling 56 with an individual driving motor. A motor which drives a roller moving billet A through the furnace is indicated at 57 and is mounted on a bracket 58 extending from a water-cooled wall 45. In a similar manner each roller for billet B is driven by a motor 59 mounted on a bracket 61 that is attached to a wall 44. Each roller for billet C is driven by a motor 62 mounted on a bracket 63, and each roller for billet D is driven by a motor 64 mounted on a bracket 65. Each shaft 54 is also preferably water-cooled, and to this end is provided with an inlet 49 similar to that used in connection with shaft 42. Located below each of the shafts is a trough 51 into which the cooling water can flow as it leaves the shaft.

The motors which drive the conveying rollers 53 upon which a given billet is placed are all connected together electrically so that they will be driven in the same direction and at the same speed. To this end each of the motors for any given level and the motors 47 driving the rollers 41 for billets being preheated are indicated as being controlled through a push-button and speed control station 66.

The temperature of the furnace units may be controlled to some desired value by any conventional temperature control system. It is preferred, however, to use a system which is responsive to the temperature of the billets. To this end there are provided four radiation pyrometer heads 67, 68, 69 and 70 that are focused upon billets A, B, C and D respectively. These pyrometers are suitably mounted between a pair of furnace units, and preferably adjacent to the end of the furnace. If desired, however, more than one set of pyrometers may be used to control the fuel to each furnace unit, or group of units, as separate zones. The responses of these pyrometers to the temperature of the billets are connected through conventional potentiometer-type instruments to adjust the supply of fuel to the burners which are focused upon the respective billets. For example, if billet A is too hot or too cold the pyrometer 67 will act through its potentiometer instrument to adjust the valves 28 or valve 28a so that the burners 16 and 17 in each of the furnace units will be throttled to vary the amount of heat supplied directly to the billet A.

In the operation of the system as a whole, the billets are placed in position to be moved from the right to the left in Figure 1 through the preheating chambers 37. The mechanism 52 receives the billets when they reach the left end of the furnace and places them one above the other so that they will be returned toward the right through the heating chambers 13 of the various furnace units. As the billets travel through these furnace chambers they will be brought up to the desired temperature and may be supplied to any suitable or desired apparatus which serves to act upon the heated billets. As shown herein, there is provided a rolling mill 73 which is capable of acting upon the four billets simultaneously. Other apparatus could of course be used.

During the time that the billets are being heated they can be individually controlled as to their speed of travel through the furnaces by adjustment of the speed of the conveyor roll driving motors for any given billet. Also, during the time that the billets are travelling through the furnace the temperature of each billet can be adjusted through relatively wide limits by adjusting the amount of fuel which is supplied to the burners that are focused upon any individual billet. It is intended that one billet after another shall be supplied to the preheating chambers and to the heating chambers so that the operation of the furnaces and of the working apparatus 73 is continuous.

If for some reason a cobble should occur in the rolling mill, the series of motors driving the billet which supplies the particular line in which the cobble occurred can be stopped, or can be reversed to remove the billets feeding that particular line from the furnace. By having individual temperature control and feeding of the billets as they are travelling to and through the furnace system it is possible to keep a substantially continuous supply of billets going to the rolling mill, for example, so that the mill or the furnace does not necessarily have to be shut down if one of the billets in the mill should develop a cobble.

It will be apparent that the temperature of the upper billets will be affected somewhat by the products of combustion produced by the burners which are focused on the lower billets. If, for example, the temperature of billet D should be raised, more products of combustion would rise in the furnace chamber from burners 23 and 24 and have a tendency to increase the temperature of the billets A, B and C. This small increase in temperature, however, could be offset by reducing the supply of fuel to the burners which are heating billets A, B and C. The heat load of each of the burners can be balanced out by the control system which is responsive to the billet temperature. The major proportion of heat which is absorbed by each billet is radiant heat that is directed from the incandescent cups of the burners. Varying the supply of fuel to the burners will change substantially the amount of radiant heat that is directed to the respective billets. Therefore, the heating effect of the products of combustion which is the minor portion of the heating can be readily compensated for by varying the incandescense of the cups of the burners which are focused upon the other billets. Thus it will be seen that the present system provides a means for heating simultaneously, in a single, unobstructed furnace chamber, a plurality of billets to temperatures and at speeds that can be individually controlled.

In the above description four billets have been shown as being moved through the preheating chambers at the same time, since the furnace units have been shown as being designed to heat four billets at a time. It will be apparent, however, that a greater or lesser number of billets could be moved at a time through the preheating chambers if desired. When this is done the speed of the drive motors for the conveying rolls 41 would be so adjusted relative to the speed of rolls 53 that the proper number of billets would at all times be available to be passed through the heating chambers of the furnace.

While in accordance with the provisions of the statutes, I have illustrated and described the best form of embodiment of my invention now known to me it will be apparent to those skilled in the art that changes may be made in the form of the apparatus disclosed without departing from the spirit and scope of the invention, as set forth in the appended claims, and that in some cases certain features of my invention may be used to advantage without a corresponding use of other features.

What is claimed is:

1. In apparatus for heating elongated work pieces, the combination of a plurality of furnace units each having a single unobstructed furnace chamber with oppositely disposed entrance and exit openings, means to mount a plurality of said units in spaced relation with said openings in alignment to form an elongated furnace, a plurality of horizontally extending rows of radiant cup type burners displaced vertically from each other firing horizontally into each furnace chamber, a plurality of individual work conveying means, means to mount said conveying means between each furnace unit and one above the other at heights substantially equal to the height of each row of burners whereby a plurality of work pieces moved simultaneously through the furnace one above the other by said conveying means will be in front of and therefore heated individually by said rows of burners, and means to drive each of said conveying means individually in the same direction.

2. In apparatus for heating elongated work, the combination of a furnace unit having an unobstructed furnace chamber therein, said chamber having oppositely disposed entrance and exit openings, a plurality of vertically displaced rows of burners firing in said chamber each row operating to heat the chamber predominantly at its level, a plurality of vertically displaced conveyor means located adjacent to each end of said furnace unit and aligned with said openings, one of the vertically displaced conveyor means at each end of the furnace unit being aligned substantially with each of said vertically displaced rows of burners so that work on each conveyor means will pass in front of one row of burners, means to adjust the supply of fuel to the burners of each row separately from the burners of each other row, and means to adjust the speed of each of the conveyor means aligned with each row of burners separately from the remainder of the conveyor means whereby the work on each conveyor means can be heated independently of the work on the other conveyor means.

3. The combination of claim 1 including means to adjust the burners in each row separately from the burners in each other row.

4. The combination of claim 1 including means to adjust the speed of the conveyor means between the furnace units of one level separately from the adjustment of the speed of the conveyor means of another level.

5. The combination of claim 1 including means to adjust the burners of each row separately from the burners of each other row, and means to adjust the speed of the conveyor means of each level separately from the speed of the conveyor means on each other level whereby billets being passed through the furnace by said conveyor means may be heated individually.

6. In apparatus for heating elongated work, the combination of a furnace including a plurality of furnace units each having a chamber with oppositely disposed entrance and exit openings, the chambers of said units forming a substantially continuous furnace chamber, vertically displaced rows of burners in said chamber, means to move an elongated work piece through said furnace in front of each row of burners, means to control the firing of the burners in each row separately from the firing of the burners in each other row, means to control the movement of each work piece separately from the movement of any other work piece, said furnace units being formed with auxiliary chambers extending through the same above and parallel to the first-mentioned chambers, said units being formed with passageways connecting the chambers therein, and means to move a plurality of work pieces through said auxiliary chambers.

7. In apparatus for heating billets, the combination of a furnace including a plurality of furnace units aligned with each other to form an elongated furnace, each furnace unit having a heating chamber and a pre-heating chamber above the heating chamber and connected therewith by passages, each of said chambers being formed with aligned entrance and exit openings, a plurality of conveying rolls each adapted to support a single billet, means to mount said conveyor rolls between each furnace unit one above the other and aligned with said entrance and exit openings, individual drive means for each conveyor roll, a plurality of conveyor rolls adapted to support more than one billet, means to mount one of said last-mentioned conveyor rolls above said first-mentioned conveyor rolls between each furnace unit and aligned with the openings in said preheat chambers, individual means to drive said second mentioned conveyor rolls, and burners in the heating chambers of the furnace units to heat the billets passing through the same, the products of combustion from said burners passing through said passages to heat the billets passing through said preheating chambers.

8. The method of heating simultaneously and individually a plurality of individual work pieces to different temperatures in a single furnace chamber which comprises moving the plurality of work pieces axially and in unobstructed relation to each other through a single furnace chamber at different vertical levels, heating each work piece by radiant heat rays directed horizontally toward the same, controlling individually the radiant heat rays directed toward each work piece, and controlling individually the movement of each work piece through the furnace chamber.

9. In apparatus for heating elongated work, the combination of a furnace including a plurality of furnace units each having a chamber with oppositely disposed entrance and exit openings, the chambers of said units forming a substantially continuous furnace chamber, vertically displaced rows of burners in said chamber, means to move an elongated work piece through said furnace in front of each row of burners, means to control the firing of the burners in each row separately from the firing of the burners in each other row, means to control the movement of each work piece separately from the movement of any other work piece, said furnace units being formed with passages extending upwardly from said chambers through which products of combustion from said burners may pass, and means for moving work pieces along said furnace above said passages whereby said last-mentioned work pieces may be preheated by the products of combustion passing through said passages.

10. In apparatus for heating elongated work, the combination of a furnace including a plurality of furnace units each having a chamber with oppositely disposed entrance and exit openings, the chambers of said units forming a substantially continuous furnace chamber, vertically displaced rows of burners in said chamber, means to move an elongated work piece through said furnace in front of each row of burners, means to control the firing of the burners in each row separately from the firing of the burners in each other row, means to control the movement of each work piece separately from the movement of any other work pieces, said furnace units each being provided with a passage extending upwardly from the chamber formed therein, conveying means to move a work piece along said furnace above the passages in each unit whereby the work pieces conveyed will be heated by products of combustion passing from said burners through said passages, and means to drive said conveying means.

FREDERIC O. HESS.

References Cited in the file of this patent

UNITED STATES PATENTS

| Number | Name | Date |
|---|---|---|
| 1,515,851 | Ferm | Nov. 18, 1924 |
| 1,819,509 | Harris | Aug. 18, 1931 |
| 1,946,971 | Harter | Feb. 13, 1934 |
| 2,100,222 | McFarland | Nov. 23, 1937 |
| 2,535,983 | French | Dec. 26, 1950 |

OTHER REFERENCES

"Electric Heating," article, pages 68, 69 and 70 of the Iron and Steel Engineer, August 1948.